United States Patent Office 3,347,883
Patented Oct. 17, 1967

3,347,883
ω-HALOGENO VINYL KETO FATTY ACID ESTERS
Masao Ohara, Ibaraki, Kiyotsugu Yamamoto, Osaka, Takashi Kamiya, Sakai, Kunihiko Tanaka, Nara, Akira Sugihara, Osaka, and Masumi Ito, Kyoto, Japan, assignors to Fujisawa Pharmaceutical Co., Ltd., Osaka, Japan, a Japanese company
No Drawing. Original application Sept. 28, 1959, Ser. No. 842,589, now Patent No. 3,132,152, dated May 5, 1964. Divided and this application May 5, 1964, Ser. No. 365,147
Claims priority, application Japan, Oct. 4, 1958, 33/28,412
4 Claims. (Cl. 260—408)

ABSTRACT OF THE DISCLOSURE

This disclosure teaches novel compounds which are lower alkyl esters of n-chloro-$(n-2)$-oxo-$(n-1)$ hexenoic acid or octenoic acid where $n$ equals 6 or 8 respectively, for use as an intermediate in the production of dithiofatty acid compounds. The dithiofatty acid compounds are growth stimulants for promoting metabolism in the internal organs of animals (including humans).

---

This application is a division of application Ser. No. 842,589 filed Sept. 28, 1959 entitled "Production of Dithiofatty Acid Derivatives and Intermediates Thereof" which application is now U.S. Patent No. 3,132,152, issued May 5, 1964.

This invention relates to the production of dithiofatty acid compounds and valuable intermediates thereof. More particularly, this invention is concerned with novel processes of producing dithiofatty acid compounds of the general formula

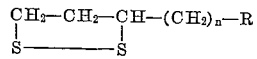

wherein:

R is a member selected from the group consisting of the carboxyl group and groups capable of yielding carboxyl groups on hydrolysis and
$n$ is an integer not exceeding 7, and intermediates useful in such processes.

Compounds of the above formula are well known as vitamin-like compounds. Especially the compound in which $n$ is 4, i.e. 6,8-dithio octanoic acid is a valuable growth stimulating substance, which promotes metabolism in the internal organs of humans and animals.

It is therefore an object of this invention to provide a novel and advantageous process of producing 6,8-dithio octanoic acid and analogous acids and intermediate compounds useful in such a process.

It is also an object of the invention to provide novel compounds which can be converted into 6,8-dithio octanoic acid, namely 6,8-dimercapto octanoic acid, which can readily be converted by the novel process according to the present invention into 6,8-dithio octanoic acid and analogous acids.

Another object of this invention is to provide new compounds of general use.

Other objects and advantageous features of this invention will become apparent from the following description thereof.

According to this invention, the production of compounds of the following Formula VIII is achieved by a novel sequence of reactions which shall be illustrated hereafter. ω-Halogeno formyl fatty acid compounds (I) are converted by said process into dithio fatty acid compounds (VIII).

The novel sequence of reactions according to this invention comprises reacting a compound (I) with acetylene in the presence of a catalyst of the Friedel-Crafts reaction type to produce a compound (II), treating said compound (II) or a compound (III), which is produced by reacting said compound (II) with a lower aliphatic alcohol, a lower aliphatic thioalcohol; a lower fatty acid, a lower thiofatty acid and functional derivatives thereof, and an aryl or aralkyl thioalcohol in an alkaline medium, or a compound (IV), which is readily produced by treating said compound (III) with a small amount of an acid, base, metal, or silicon compound and which is also readily produced by treating said compound (II) with an alkali thiocyanate, alkali mono- and polysulfide or alkali thiosulfate, with hydrogen and hydrogen sulfide in the presence of a metal sulfide catalyst to produce a compound (V), reacting said compound (V) with an organic sulfonyl halide in alkaline medium to produce a compound (VIII), and if required, hydrolyzing said compound (VIII) to produce the corresponding free acid, if said compound (VIII) is not the free acid. This process according to the present invention is illustrated diagrammatically as follows:

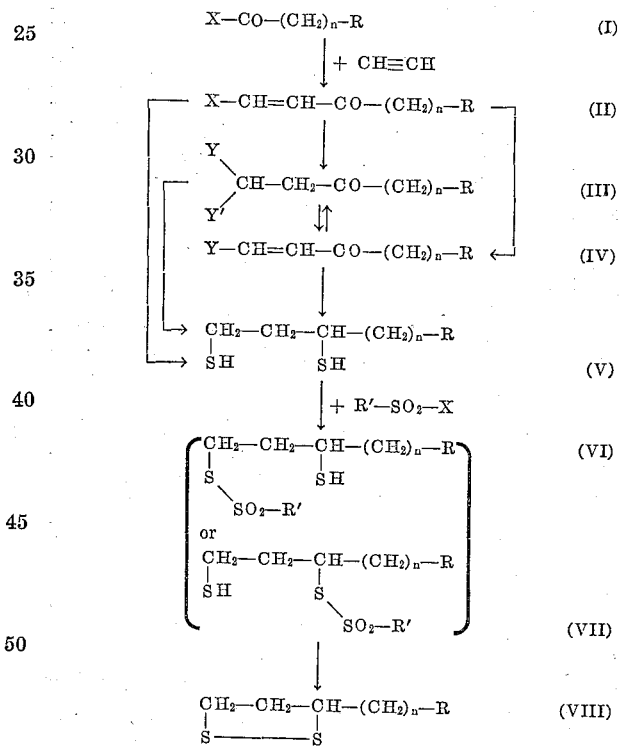

In these formulas:

X is halogen,
R is a carboxy group or a group convertible into a carboxy group by hydrolysis,
$n$ is an integer not exceeding 7,
Y and Y' are substituted mercapto groups including thiocyano groups and substituted hydroxyl groups, and
R' is alkyl, aryl, or aralkyl.

Groups convertible into carboxyl groups by hydrolysis include, for instance, ester and amide groups.

More particularly the present invention is concerned with the conversion of ω-halogeno formyl fatty acid compounds (I) into ω-halogeno vinyl keto fatty acid compounds (II).

Acetylene is used as reactant to react with ω-halogeno formyl fatty acid compounds (I) in place of ethylene which was employed in the method known to the art.

It may be pointed out that, heretofore, ethylene was considered essential as a reactant to convert compounds (I) into the final compounds (VIII).

The reaction between ω-halogeno formyl fatty acid compounds (I) and acetylene according to this invention is conveniently effected in the presence of catalysts as they are generally used in Friedel-Crafts reaction such as aluminum chloride, zinc chloride, cadmium chloride, ferric chloride, boron trifluoride, and others. It is preferred to use a solvent which dissolves the starting compound (I) but does not interfere with the reaction, such as halogenated hydrocarbons, for instance, chloroform, carbon tetrachloride, dichloro ethane, tetrachloro ethane, and others. Preferably the reaction is carried out at room temperature or even at lower temperatures.

The reaction is continued under the condition mentioned above till absorption of acetylene is completed, whereafter the reaction mixture is poured onto ice water and is extracted with an organic solvent. The solvent is then evaporated. The residue is distilled in vacuo yielding ω-halogeno vinyl keto fatty acid compounds (II) in a good yield.

ω-halogeno vinyl keto fatty acid compounds (II) prepared as described above are then converted to dimercapto fatty acid compounds (V) directly or by way of keto fatty acid compounds (III) or (IV), both of which are readily converted into compounds (V). The reaction, by which compounds (II) are converted into the intermediate compounds (III), is conveniently effected by reacting said compounds (II) with lower aliphatic alcohols or thioalcohols such as methanol, ethanol, propanol, butanol, methyl mercaptan, ethyl mercaptan and others; with lower fatty or thio fatty acids such as acetic acid, propionic acid, butyric acid, thio acetic acid, and others; or with functional derivatives of such lower fatty acids or thio fatty acids such as their anhydrides, metal salts and others; or with aryl and aralkyl thio alcohols such as benzyl thio alcohol, phenyl thio alcohol, and others, in an alkaline medium to produce the corresponding keto fatty acid compounds (III).

The said reaction is conveniently effected at room temperature or lower temperatures. It is preferred to use an alkaline agent such as alkali metals, alkali metal hydroxides, alkali metal carbonates, alkali metal bicarbonates, and many other alkaline agents generally used, to yield an alkaline medium in this reaction. Lower aliphatic alcohols or thio alcohols, lower fatty acids or thio fatty acids, the functional derivatives thereof, and benzyl thio alcohol, and others which react with compounds (II) may also act as solvents in this reaction. Although addition of other solvents, is therefore, not required, a solvent which does not interfere with the reaction may be added.

Compounds (II) may be converted into compounds (IV) by a treatment with a sulfur compound such as an alkali metal thiocyanate, and alkali metal mono- and poly-sulfide or an alkali metal thiosulfate.

Compounds (IV) are also obtained almost quantitatively by heating compounds (III) with a small amount of an acid such as sulfuric acid, phosphoric acid, organic sulfonic acids, salts of organic acids, and others, with a base such as an alkali metal hydroxide, an alkali metal carbonate, and the like, with various metals, with silicon or silica gel, and others, to remove the groups Y' from compounds (III).

On the other hand, compounds (IV) are easily reconverted into compounds (III) by a treatment with an excess amount of alcohols or acids in the presence of a catalyst such as a base, for instance, an alkali metal alcoholate and the like or such acids as hydrochloric acid and the like. The reaction is conveniently effected at room temperature with a good yield.

Dimercapto fatty acid compounds (V) are produced by reduction of compounds (II), compounds (III), or compounds (IV), all of which may be produced as described above. This reduction comprises treating compounds (II), compounds (III), or compounds (IV) with hydrogen and hydrogen sulfide in the presence of a catalyst metal sulfide, for instance, in the presence of an iron, nickel, cobalt, molybdenum, and the like sulfide, under pressure. The catalyst described above retains its activity in the reaction mixture although it includes sulfur.

The catalyst may be prepared by various methods as they are known to the art. For instance, one of the usual methods comprises introducing hydrogen sulfide into a solution of a metal salt or adding a solution of an alkali metal sulfide to said solution to precipitate the metal sulfide and thoroughly washing the resulting precipitate with water and then with the same solvent as used in the reaction. It is preferred to employ the catalyst in this reaction immediately after its preparation. Another method may also conveniently be used which comprises introducing hydrogen sulfide into the reduction vessel containing the respective metal powder, thereby producing the desired metal sulfide catalyst directly in the vessel at the start of the reduction process. The catalyst may be mixed with a carrier such as carbon, diatomaceous earth, alumina, magnesia, and the like. Although the proportion of catalyst used in the reaction to the compound to be reduced is not limited to a specific proportion, it is preferred to employ comparatively large amounts thereof, for instance, catalyst amounts of 20% to 50% of the weight of the compound to be reduced are conveniently used, when the catalyst is not combined with a carrier.

All inert solvents which have no effect on the reaction such as alcohols, benzene, toluene, xylene, ethers, esters, fatty acids, dioxane, and others, may be used. When such an acid as acetic acid, which is a preferred solvent, is used and the compound to be reduced is an ester of the carboxylic acid, the reduction product is obtained in the form of the free acid as a result of an ester exchange reaction between the solvent used and the compound to be reduced. In that case subsequent esterification of the product is necessary, if an ester is desired as the reaction product. Such esterification may be effected by the usual methods well known in the art.

Hydrogen sulfide may be prepared by reaction of sulfur with hydrogen in the reduction vessel, so that separate preparation of hydrogen sulfide is not necessary. This method is the preferred procedure, because the amount of hydrogen sulfide used may readily be adjusted by the amount of sulfur added. Another preferred method to control the reaction is to place a definite amount of hydrogen sulfide into the vessel used in the reduction process. Furthermore, sulfur compounds which are precursors of hydrogen sulfide, may be used in this reaction, in place of hydrogen sulfide, in order to produce hydrogen sulfide. Such precursors are, for instance, carbon disulfide, sulfurous acid, and others. Preferably hydrogen sulfide is used in an amount considerably in excess to the theoretical amount since lack of hydrogen sulfide tends to increase the production of by-products.

In this reaction step the allowable range of temperature and pressure is comparatively broad. For instance, reaction may be achieved at a temperature below 100° C. A temperature of 100° C. to 200° C., especially at about 150° C. is, however, preferred to accelerate the reaction. The reaction is conveniently effected at the pressure exceeding 50 atm., especially at 100 atm. to 150 atm.

When using ω-halogeno vinyl keto fatty acid compounds (II) as starting materials in this reaction, the reaction is conveniently carried out in the presence of a corresponding amount of a base to combine with the hydrogen halide formed during the reaction.

The resulting dimercapto fatty acid compounds (V) are converted in a good yield into dithio fatty acid compounds (VIII) by reaction with organic sulfonyl halides in an alkaline medium. Thereby, substantially no by-products which tend to result from over-oxidation, are produced in the last reaction step of this invention. In this reaction, it can be assumed that intermediates (VI)

or (VII) are produced on the way to obtain the final compounds. However, it is not exactly known which of these compounds is mainly produced, but it can be assumed that substitution in ω-position will be preferred over that in another position. The sulfonic acid ester group of the resulting intermediate will immediately be removed so as to automatically produce the disulfide bond in the molecule. However, it will be easily understood that it is not necessary to separate the intermediate compounds and to confirm their structure.

Organic sulfonyl halides used in this reaction step include alkyl, aryl, or aralkyl sulfonyl halides, such as p-toluene sulfonyl chloride, benzene sulfonyl chloride, methane sulfonyl chloride, and the like. As solvents there are preferably used solvents such as dry benzene, ethers, toluene, hexane, and others. The reaction is effected in an alkaline medium which may be obtained by the addition of inorganic or organic bases such as solid alkali metal hydroxides, anhydrous alkali metal carbonates, pyridine, and others. Particularly, it is preferred to use organic bases such as pyridine, since said bases act also as solvents.

If desired, the resulting products may be hydrolyzed to produce the free carboxylic acids of the formula

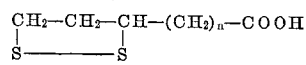

wherein $n$ is the same integer as mentioned above, if the reaction products are not the free acids.

This invention is illustrated by the following examples. It is understood, however, that the invention is not to be limited to the specific disclosure of these examples.

*Example 1.—Methyl 8-chloro-6-oxo-7-octenoate*

10 g. of methyl 5-chloro formyl-n-valerate are dissolved in 40 ml. of carbon tetrachloride and 15 g. of aluminum chloride are added. Acetylene gas is introduced into the mixture, thereby keeping the temperature at about 10° C. while stirring vigorously. After absorption of acetylene ceases, the resulting viscous mixture is poured onto a mixture of salt and ice. The carbon tetrachloride layer is separated. The remaining water layer is extracted with carbon tetrachloride and the extract is added to the solution of carbon tetrachloride separated before. Said solution is washed with water and dried. The residue obtained by evaporation of the solvent is distilled in vacuo yielding 8 g. (70% of the theoretical yield) of methyl 8-chloro-6-oxo-7-octenoate of the boiling point 106° C./0.35 mm. which immediately crystallizes. The product is recrystallized from petroleum ether to crystals of the melting point 52° C.

*Analysis.*—Calculated for $C_9H_{13}O_3Cl$: C, 52.79; H, 6.41. Found: C, 52.83; H, 6.53.

*Example 2.—Methyl 8-chloro-6-oxo-7-octenoate*

170 ml. of tetrachloro ethane are saturated with acetylene gas at 0° C. 98 g. of pulverized aluminum chloride are added and acetylene gas is introduced into the solution. 54.5 g. of methyl 5-chloro formyl-n-valerate are added slowly at a temperature below 10° C. while stirring. Introduction of acetylene gas is continued at about 20° C. while stirring. After absorption of acetylene ceases. the reaction mixture is poured onto a mixture of ice and saturated salt water and is extracted with benzene. The benzene solution is washed with water and dried, and the solvent is evaporated. The residue is distilled in vacuo yielding 49.3 g. (79%) of methyl 8-chloro-6-oxo-7-octenoate of the boiling point 130–140° C./5–6 mm. Hg which immediately crystallizes. The compound is recrystallized from petroleum ether to yield colorless needles of the melting point 52° C.

*Example 3.—Methyl 6-chloro-4-oxo-5-hexenoate*

24.5 g. of methyl 3-chloro formyl-n-propionate are dissolved in 80 ml. of tetrachloro ethane and 48 g. of aluminum chloride are added thereto. Acetylene gas is introduced into the mixture at about 5° C. After absorption of acetylene ceases, the reaction mixture is poured onto a mixture of salt and ice and is extracted with benzene. The benzene layer is washed with water and dried, and the solvent is evaporated. The residue is distilled in vacuo yielding 18 g. (62.7%) of methyl 6-chloro-4-oxo-5-hexenoate of the boiling point 109–113° C./6 mm. Hg.

*Analysis.*—Calculated for $C_7H_9O_3Cl$: C; 47.62; H, 5.14. Found: C; 47.72; H; 5.10.

Conversion of the resulting reaction products (II), i.e. of methyl 8-chloro-6-oxo-7-octenoate of Examples 1 and 2 and of methyl 6-chloro-4-oxo-5-hexenoate of Example 3 into the valuable dithio fatty acid compounds (VIII) is effected as described in said copending application Ser. No. 842,589.

In place of aluminum chloride used as Friedel-Crafts catalyst in Eamples 1 to 3, there may be employed other Friedel-Crafts catalyst in equivalent amounts such as zinc chloride, ferric chloride, cadmium chloride, boron trifluoride, and others while otherwise the procedure is the same as described in said examples.

In place of the methyl esters of 5-chloro formyl-n-valeric acid or of 3-chloro formyl-n-propionic acid as used in said Examples 1 to 3, there may be employed equimolecular esters of other ω-halogeno formyl fatty acids such as the ethyl or benzyl esters of 2-chloro-formyl acetic acid, 4-bromo formyl-n-butyric acid, 6-chloro formyl-n-hexanoic acid, 7-bromo formyl-n-heptanoic acid, 8-chloro formyl-n-octanoic acid or the free acids themselves while otherwise the procedure is the same as described in said Examples 1 to 3.

We claim:
1. The methyl ester of 8-chloro-6-oxo-7-octenoic acid.
2. The methyl ester of 6-chloro-4-oxo-5-hexenoic acid.
3. The lower alkyl ester of 8-chloro-6-oxo-7-octenoic acid.
4. The lower alkyl ester of 6-chloro-4-oxo-5-hexenoic acid.

References Cited
UNITED STATES PATENTS
2,806,047  9/1957  Bullock _____ 260—483

OTHER REFERENCES
Price et al.: Organic Syntheses, vol. 32 (1952), pp. 27–29.

Raphael, Acetylene Compounds in Organic Synthesis, page 79, 1955.

ALEX MAZEL, *Primary Examiner.*

R. GALLAGHER, *Assistant Examiner.*